(12) United States Patent
Fretwell

(10) Patent No.: US 9,838,854 B2
(45) Date of Patent: Dec. 5, 2017

(54) REMOTE HEALTH MONITORING SYSTEM

(71) Applicant: TweetTime, LLC, Fort Lauderdale, FL (US)

(72) Inventor: Helen Fretwell, Fort Lauderdale, FL (US)

(*) Notice: Subject to any disclaimer, the term of this patent is extended or adjusted under 35 U.S.C. 154(b) by 0 days.

(21) Appl. No.: 15/247,025

(22) Filed: Aug. 25, 2016

(65) Prior Publication Data

US 2017/0064521 A1   Mar. 2, 2017

Related U.S. Application Data

(60) Provisional application No. 62/209,514, filed on Aug. 25, 2015.

(51) Int. Cl.
*H04W 4/12* (2009.01)
*H04M 1/725* (2006.01)
*H04M 1/247* (2006.01)
*H04W 4/22* (2009.01)

(52) U.S. Cl.
CPC ........... *H04W 4/12* (2013.01); *H04M 1/2477* (2013.01); *H04M 1/72536* (2013.01); *H04W 4/22* (2013.01)

(58) Field of Classification Search
CPC .... G06Q 10/10; G06Q 10/1095; H04L 67/26; H04W 4/008; H04W 4/023
USPC ............ 455/41.2, 404.1; 370/329, 331, 442; 709/202, 204, 227
See application file for complete search history.

(56) References Cited

U.S. PATENT DOCUMENTS

2016/0071403 A1*   3/2016   Vaidhyanatan ........ G08B 27/00
340/502

* cited by examiner

*Primary Examiner* — Sam Bhattacharya
(74) *Attorney, Agent, or Firm* — Bodi Law LLC

(57) ABSTRACT

A system and method that provides one or more programs that can be installed and activated on a smart device such as a smart phone, tablet, phablet, laptop, or other mobile computerized device to enable the device to be used by an individual to be monitored remotely for the potential occurrence of an injury or medical issue(s). This is done through operation of an application installed on the smart device which is regularly "pinged" by a central server, requiring a response from the individual to ensure that the individual is not impaired. Should no such response be forthcoming, the system will detect the lack of response and notify an appropriate person or organization or responder to attempt to contact the monitored individual and/or send aid.

5 Claims, 24 Drawing Sheets

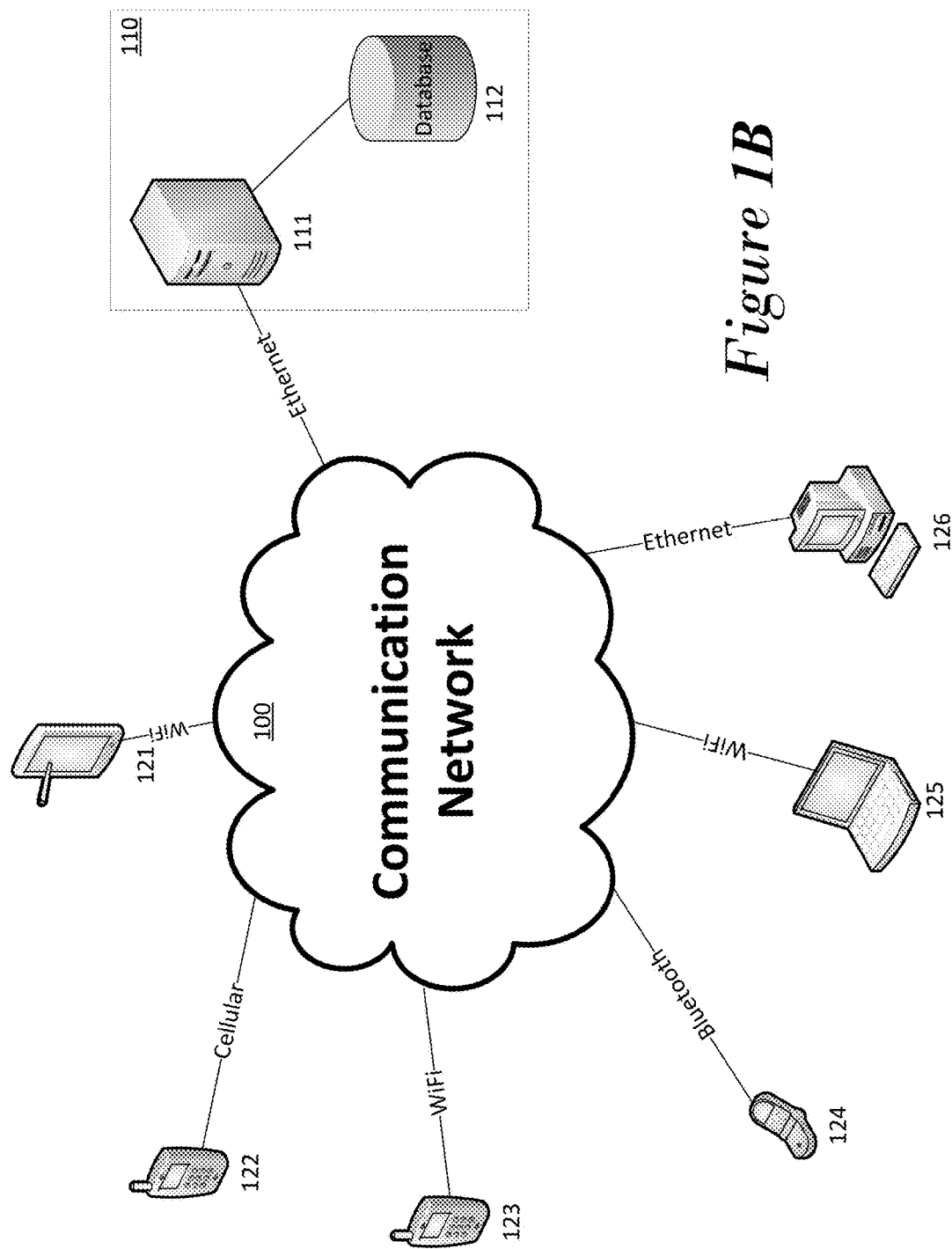

REMOTE HEALTH MONITORING SYSTEM

CROSS-REFERENCES TO RELATED APPLICATIONS

This application claims the benefit of provisional patent application Ser. No. 62/209,514 that was filed on Aug. 25, 2015, and is incorporated herein by reference.

BACKGROUND

Individuals who are elderly, young, have health issues, or for other reasons often should be monitored for safety reasons in case they are injured or have a medical issue. Currently, there are no cheap but effective monitoring systems that utilize commonly available communication equipment that is available to most individuals.

SUMMARY

Provided are a plurality of example embodiments, including, but not limited to, a method for remotely monitoring the health, safety, and/or welfare status of an individual user, said method comprising the steps of:
  providing a computer system including a server and database;
  providing user software for a user mobile device for installation and use by a use for supporting the method;
  the computer system providing an input interface on the user mobile device using said user software, said input interface configured for accepting information from the user including information about a plurality of contact information about each one of a plurality of contact persons approved by the user, the contact information being stored in the database;
  the computer system sending periodic ping messages to said user mobile device over a communication network;
  in response to the user the user device receiving the ping messages, the user device providing a response interface on the user device configured to accept an input from the user acknowledging receipt of the ping messages;
  in response to the user device accepting the input from the user acknowledging receipt of the ping messages, the user device sending an acknowledgement message to the computer system over the communication interface for acknowledging the ping messages;
  the computer system monitoring receipt of the acknowledgement messages from the user device for detecting when no acknowledgement message is received from the user device in response to a ping message within a predetermined time period;
  in response to the computer system detecting that no acknowledgement message was received from the user device in response to a ping message within a predetermined time period, the computer system selecting a first one of the contact persons from the contact information stored in the database;
  the computer system contacting the first contact person by sending a help request message to a contact device of the first contact person over a communication network requesting approval or non-approval for checking the status of the user;
  if the computer system receives an non-approval message from the contact device of the first user, the computer system selecting a second one of the contact persons from the contact information stored in the database; and
  the computer system contacting the second contact person by sending a help request message to a contact device of the second contact person over a communication network requesting approval or non-approval for checking the status of the user.

Also provided is a system including the computer system for implementing the above method(s).

Also provided are additional example embodiments, some, but not all of which, are described herein below in more detail.

BRIEF DESCRIPTION OF THE DRAWINGS

FIG. 1B is schematic showing an example implementation of the system of FIG. 1A;

DETAILED DESCRIPTION OF THE EXAMPLE EMBODIMENTS

Figure 1A:
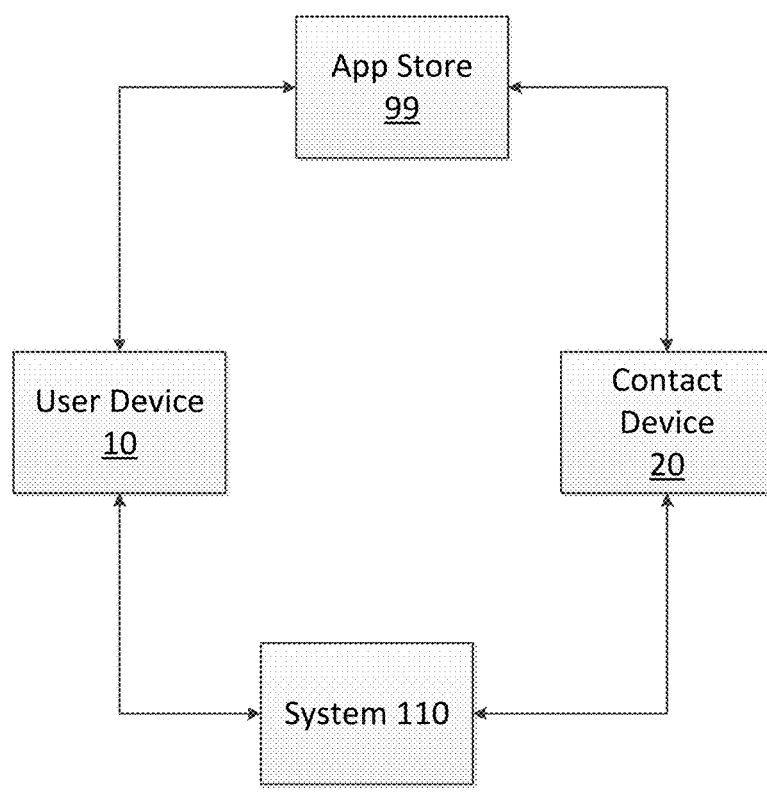
FIG. 1A is a block diagram showing an example embodiment of the system.

Disclosed is system and method that provides one or more programs that can be installed and activated on a smart device such as a smart phone, tablet, phablet, laptop, or other mobile computerized device to enable the device to be used by an individual to be monitored remotely for the potential occurrence of an injury or medical issues. This is done through operation of an application installed on the smart device which regularly "pings" the individual, requiring a response from the individual to ensure that the individual is not impaired. Should no such response be forthcoming, the system will detect the lack of response and notify an appropriate person or organization to attempt to contact the monitored individual and/or send aid.

As one example system, a centralized server application can be used to independently ping (based on a simple per client timer) over a communication network (such as cellular or the Internet or other networks individually or in combination) multiple remote mobile applications running on various clients' remote devices (e.g., smart phones, tablets, etc.) and determine via receipt (or lack thereof) a return message whether to re-set the timer or to escalate by sending a new message to a designated secondary recipient.

Both the server and the remote application will require minimal functionality and can each be limited to a single operating system to reduce complexity, development time and cost.

Functionality description: The Server and Mobile Application are configured to support bi-directional text messaging and email delivery.

The Server is configured to independently send text and emails messages to a plurality of mobile recipients, and will utilize a Decision algorithm based on internal timer and recipient acknowledgement of message(s). The server will be capable of multiple threaded outstanding message handling.

The Mobile Application is configured with the ability to receive text messages from server and allow user to respond with an acknowledgement message, and when no such acknowledgement is provided within the predetermined time period, the system (server) can determine that a problem exists, and respond accordingly, such as by contacting a designated contact person or emergency provider.

Purpose & Use: The system and method provides a mobile based application solution (app) for an individual personal's use. The app facilitates improved personal monitoring via system generated notifications and alert routines. The automated system enhances personal monitoring and aids in the execution of care for the user's health and welfare if needed. This mobile device application can be downloaded to broad spectrum of mobile devices (phones, tablets, watches). The application is designed to send customized regular (e.g., daily, hourly) pings to the user's device. Once the ping is (or is not) acknowledged, a notice is sent to an identified alert contact for follow-up assistance if required.

Furthermore, an emergency alert function can be provided which allows the user to immediately contact an emergency contact without requiring a missed ping response. This allows the user to immediately call for help during an emergency situation.

For example, the mobile app will be able to: (1) Facilitate predictable monitoring frequency for individual health and welfare; (2) Tailor alert sequence to individual requirements; (3) Use current mobile technologies; (4) Improve timeliness and quality of monitoring, emergency notification and information sharing; (5) Improve performance of monitoring; (6) Manage quality and cost of providing monitoring services; (7) Non-Intrusive automated alert system; and (8) Reduces human inconsistency via automated notifications Users will be able to purchase (e.g., from an app store) and implement the mobile app in minutes with minimal strain, achieving unprecedented time-to-value and ROI. Its solutions are delivered through secure Web Servers, Web Application and Personal Mobile Devices such as phone, tablet, watch etc.

FIG. 1A shows an example system diagram showing the various participants in an example system implementing the system described herein. The user (monitored person) uses a user mobile computer device 10 that can download an application from an app store 99. Likewise, a contact person using a contact mobile computing device can also, if necessary, download an application from app store 99. Then, when devices 10, 20 are properly configured as described herein, the mobile devices 10, 20 interact with the system 110 to provide the features described herein.

FIG. 1B shows an example implementation of the system of FIG. 1A, in that mobile devices 10, 20 can be implemented using any of the devices 121-126, for example, among others. These mobile devices are connected to a communication network 100, such as the Internet using various communication protocols such as WiFi, Bluetooth, Ethernet, Cellular, or some other protocol. The Internet is also connected to the system 110, which can comprise a server 111 and a database 112, for example.

An example mobile app Flow/Process is: (1) Mobile Server (Apple, Google . . . ) Houses App for Download; (2) App User uses Mobile Device (Phone, Tablet, Watch . . . ) to Downloads App from Mobile Server; (3) App User Configures App on Mobile Device. Save Sends Configuration to Web App on Web Server; (4) Web App on Web Server (Amazon, Cloud Server . . . )Saves Configuration for Timer and App Routine Execution; (5) Web App/Server Sends Request for Push Notification to be Sent to the Mobile Server Based on User Configuration of Time Interval; (6) Mobile Server (Apple . . . ) Sends Push Notification to TweetTime User Mobile Device (Phone, Table, Watch . . . ); (7) TweetTime User Responds to Push Notification (Yes/No); (8) Web App/Server Listens for Response Type. Based on (Y/N) and Executes Configured Routines (N-Ends Routine and resets Web App Timer for Next Timer Interval: Y-Executes Notification Routines); (9) Web App/Server Sends SMS Request to SMS Server; (10) SMS Server Sends SMS/TXT to Alert Contact #1; (11) Web App/Server Sends Email to Alert Contact #1; (12) Alert Contact #1 Responds to SMS/Email (Accept/Reject); (13) Web Server Listens for response from Alert Contact #1 (Y-Ends Routine, N—Alert Notification Steps Repeat for Alert Contact #2; (14) Web Server Repeats Steps 9-13 for Alert Contact #2; (15) After Alert Contact Response to Accept or After 2 Alert Contact Routines, the Web App Resets the Timer for the Next Push Notification Interval; (16) Next Configured Time Interval begins Again with Step 5 and Repeats Until the Timer is Turned Off or Reconfigured for New Time Interval The User can set settings & profiles in the app, such as: (1) Personal information (name, cell phone, home phone, email, address); (2) Other contacts that can receive the alert (name, phone, email, address); (3) Set interval time to receive notifications or message.

Figure 2:
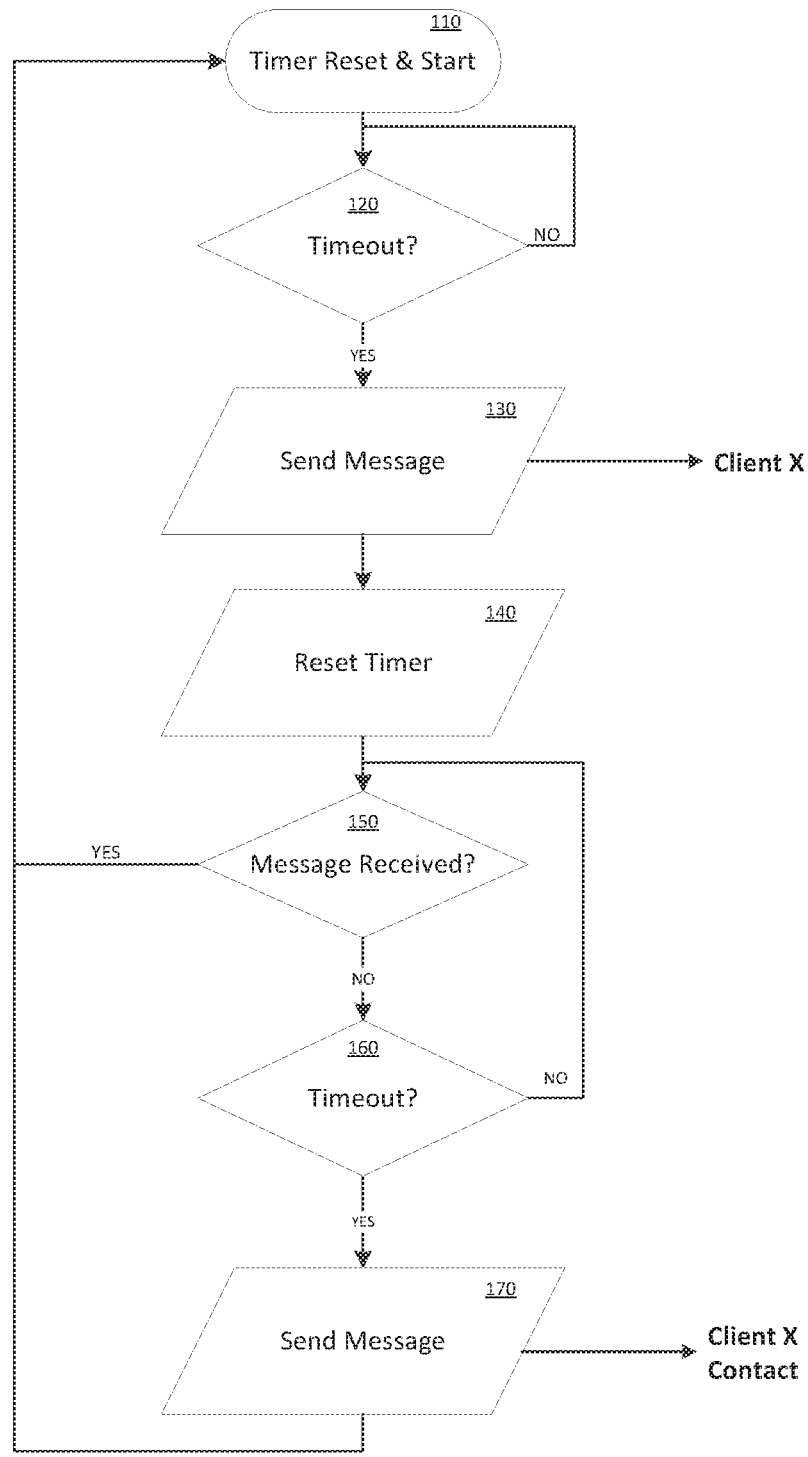
FIG. 2 is a flow chart showing an example server state flow for the process monitoring example remote devices.

FIG. 2 shows the server state flow for the process monitoring the remote devices. The server sets the timer and starts the process 110, checks for a timeout 120, sends a message to the client X 130 after timer times out, and a timer is set 140 to wait for a receipt of a reply message 150 for a certain amount of time 160. If the reply is not received before the time period times out, then a message is sent to a device for the secondary contact for client X 170, notifying the secondary contact that there may be a problem with client X.

Figure 3:
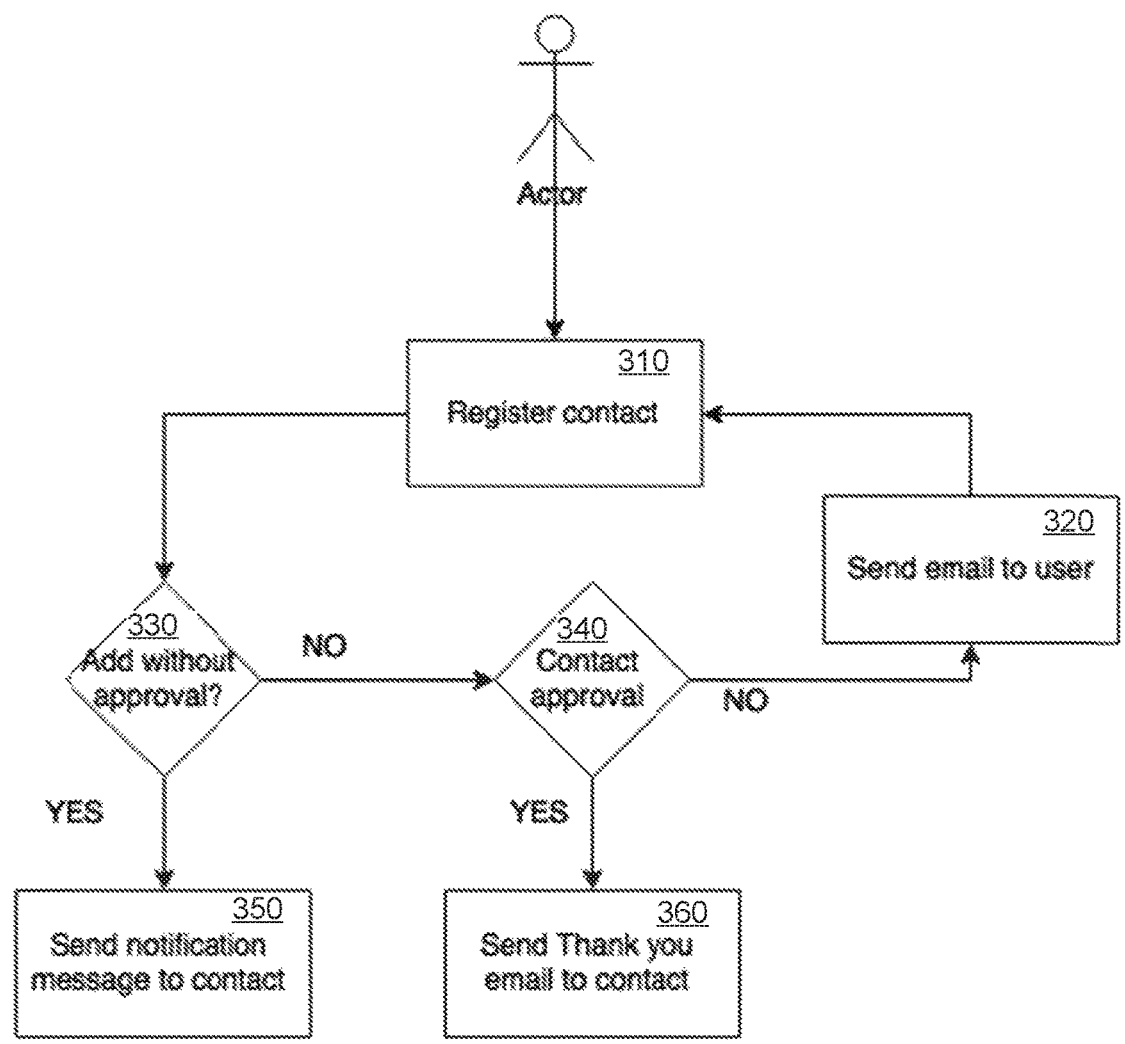
FIG. 3 is a flow chart of an example approval process on the example server for a contact of FIG. 2.

FIG. 3 shows a flow for the approval process on the server for the secondary contact of FIG. 2, in that the contact is registered 310 based on the approval of the client 330, 340. The client is notified of the attempted registration 350 (e.g., by email) and can approve the contact by message 360 (e.g., email).

Figure 4:
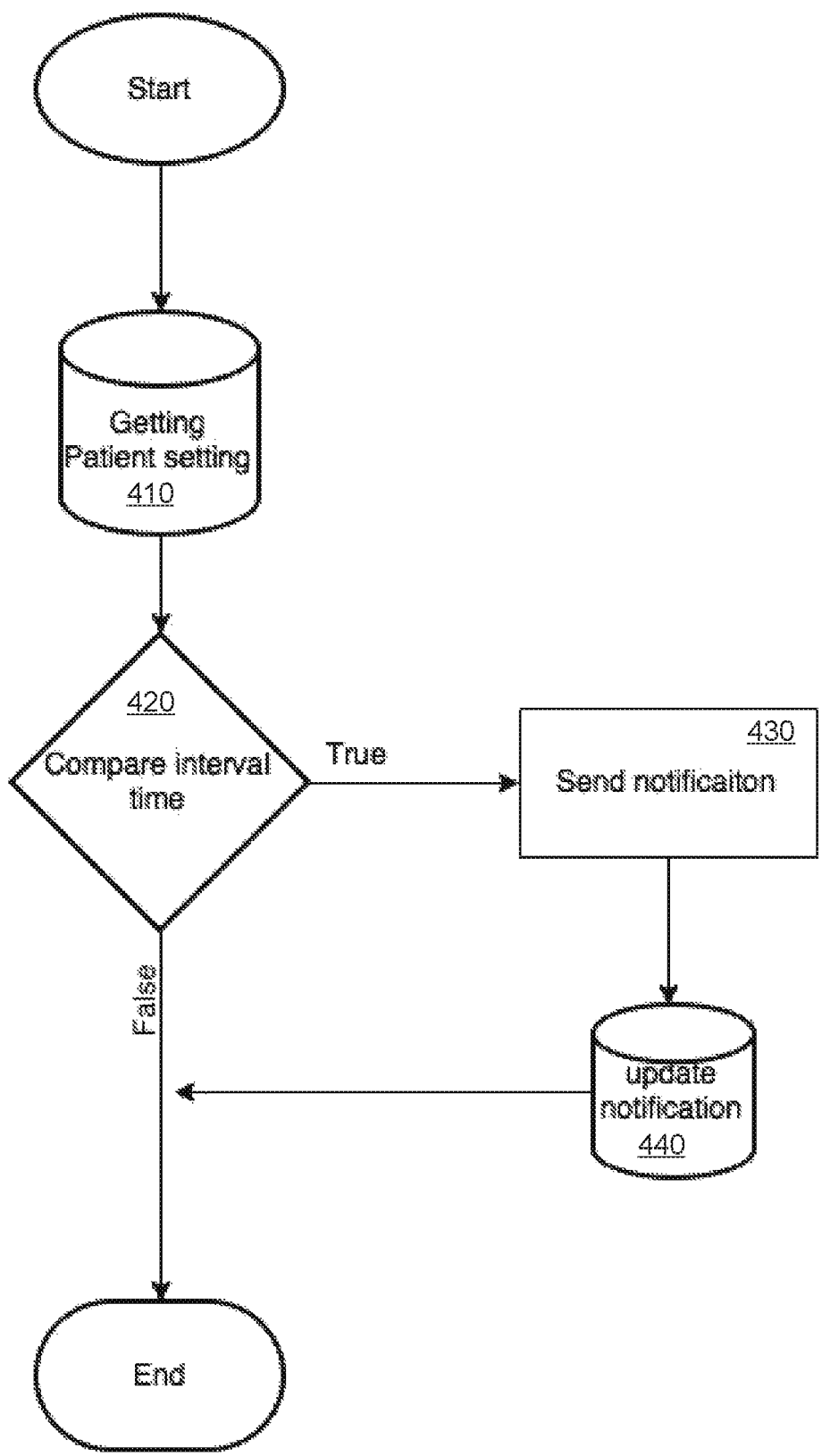
FIG. 4 is a flow chart of an example process on the example server for updating patient settings in the server.

FIG. 4 shows a process on the server for updating patient settings in the server including obtaining the patient setting 410, comparing the interval time 420 and if it is time sending a notification 430 and updating that the notification was sent 440.

Figure 5:
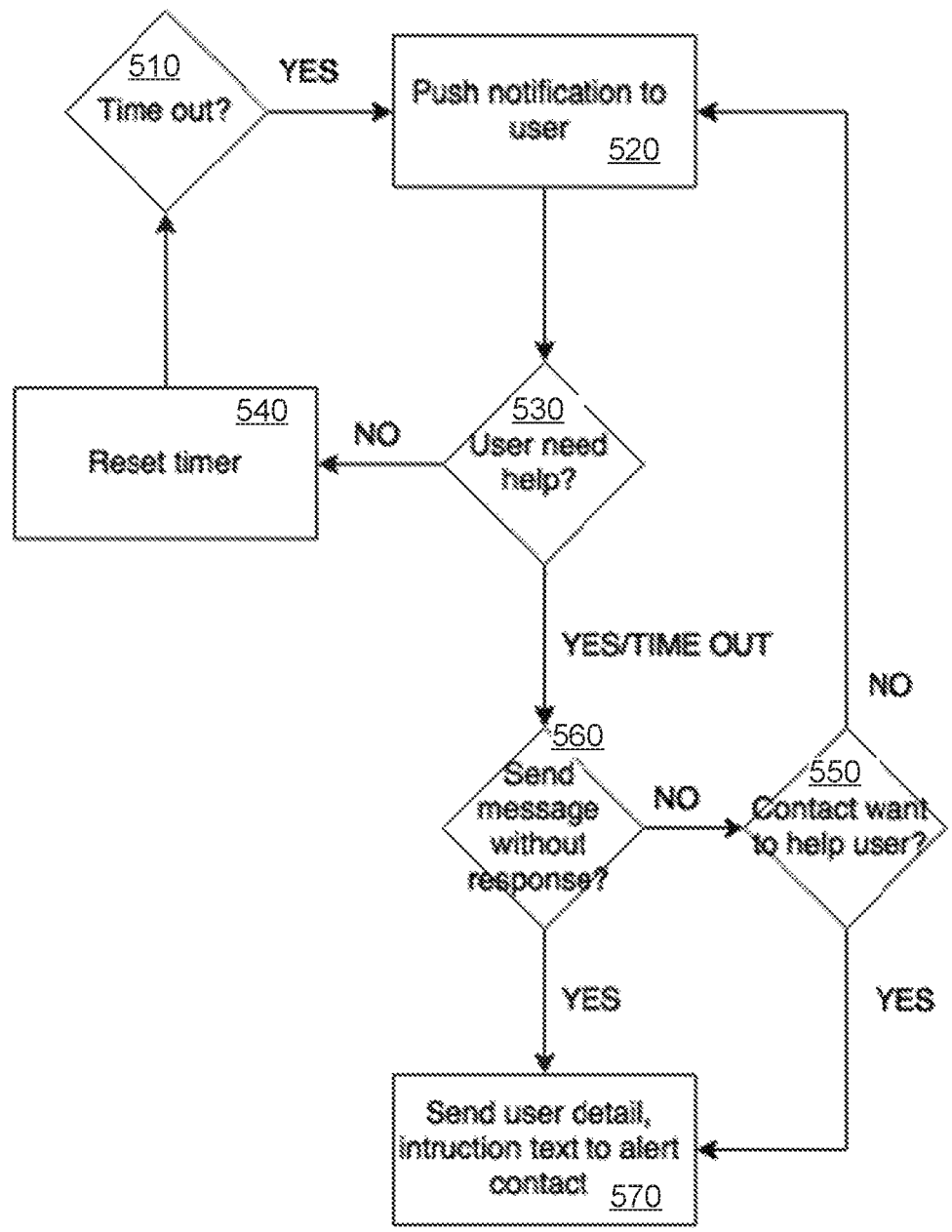
FIG. 5 is a flow chart of an example process on the example server for pushing notifications to the user devices.

FIG. 5 shows the process on the server for pushing notifications to the user 520 when there is a time out 510, where the user can request help in response to the notification process 530, and the contact person is sent a message 560 asking if they are willing to help the user. If the contact is not willing to help 550, then the system will notify another contact 570 and ask if they will help. In this manner, 2, or more, and in some cases any number of contacts persons can be registered, and contacted in a predetermined sequence (e.g., predetermined by the user), until one is willing to help. In the case of two contacts, if neither answers after a period of time, the system resets a timer 540 for the next interval.

Figure 6:
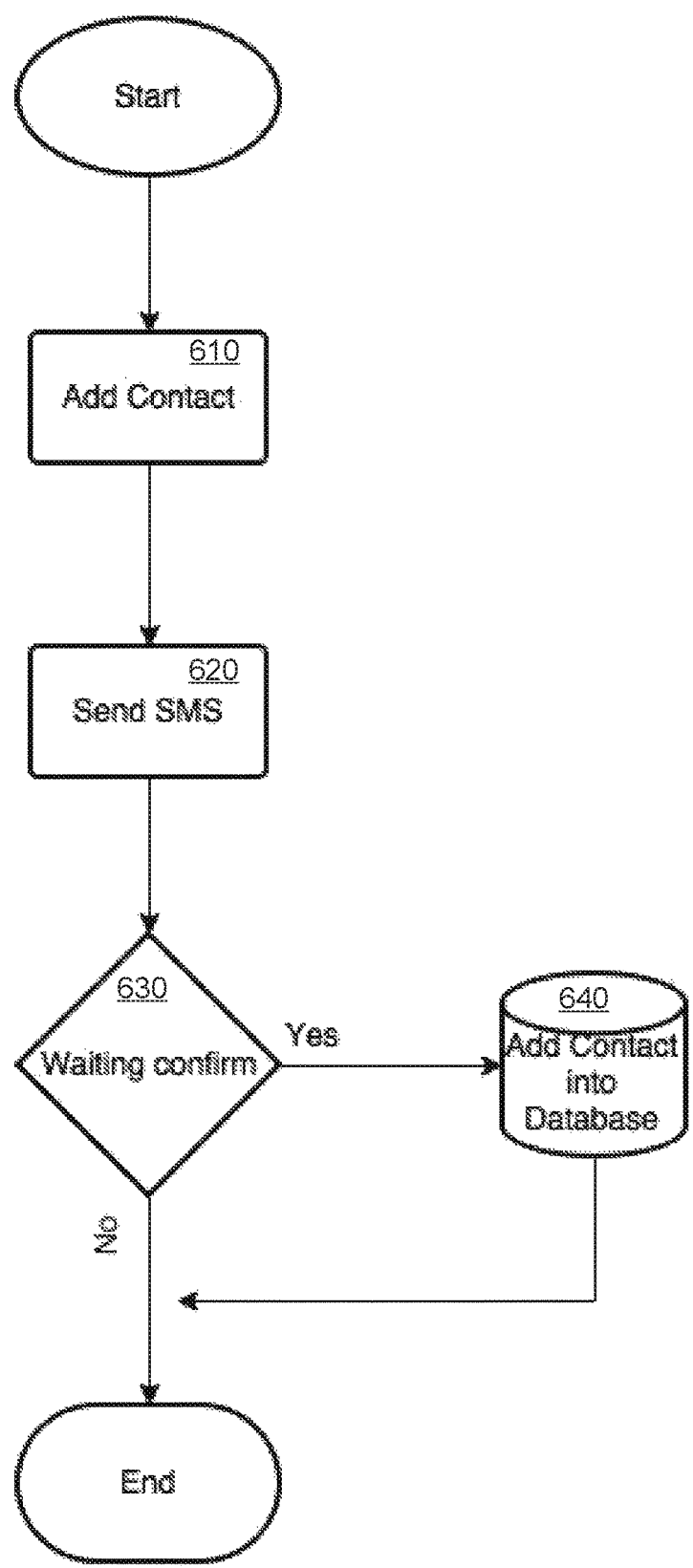
FIG. 6 is a flowchart of an example process on the example server for adding a new contact and testing an alert message for reception by the new contact.
Figure 7:
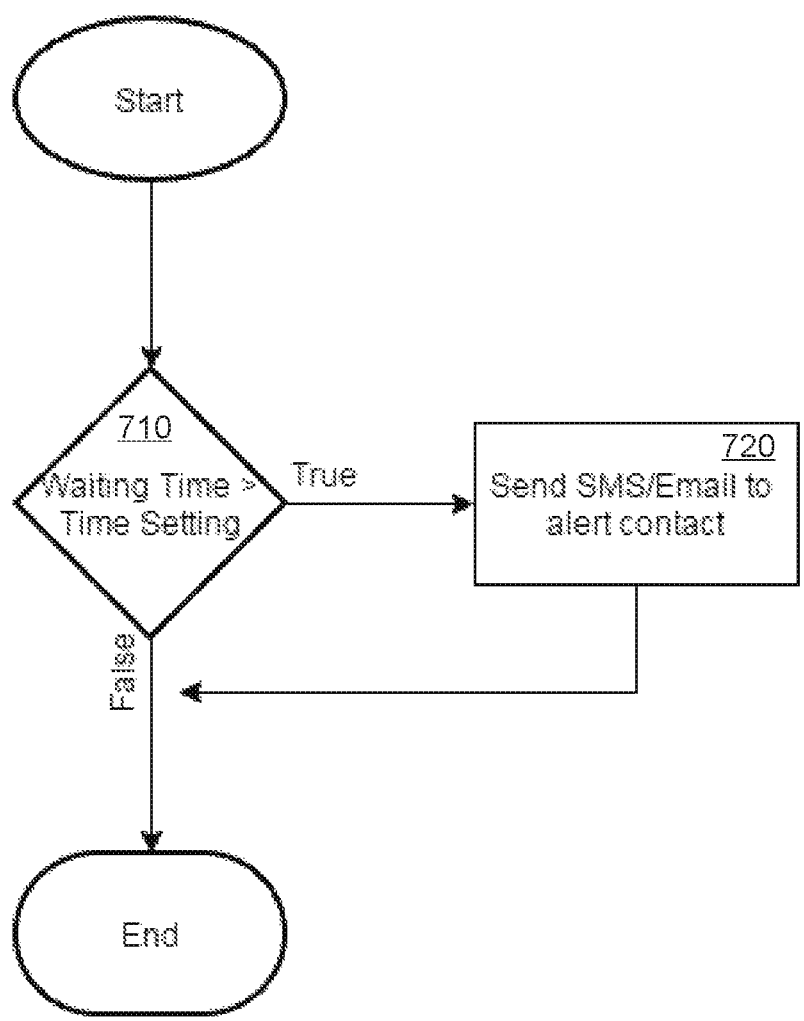
FIG. 7 is a flowchart of an example process on the example server for sending an alert to the contact.

FIG. 6 shows a process on the server for adding a new contact 610 and testing the alert message for reception by the new contact 620, 630. In this way, the contact messaging process can be tested before it is finalized 640. FIG. 7 is the process on the server for sending an alert to the contact 710, 720. Note that alerts might be sent by SMS messaging, text messaging, email, voice notification, etc.

An Email/SMS template for contacts can be provided with the following information:

Alert contact registration notification: [user_name] requests to have you as user's [app_name] contact. By accepting this request, you agree to be notified to initiate alert procedures for user's health and welfare purpose. To accept click ACCEPT. To Reject click REJECT.

Accept response email/text: [alert_contact] I want to thank you for accepting to be my Alert Contact. If I fail to activate my mobile device, you will be notified by [app_name]. I ask that you initiate contact with me. If we do not connect, please follow the detail instructions sent to you via email/text for emergency purposes. Thank you for your help in ensuring my health and welfare. Regards, [user_name]

Reject response from alert contact: [user_name] "Alert contact name" has selected not to be an alert contact. Please select an alternative alert contact.

Alert notification to alert contact: [user_name] has not activated the user's mobile device as of [notification_time_set]. Please initiate contact with [user_name] by clicking this.

An example Architecture for the system could include:

Server: Host AWS for 1-year trial; Language: PHP 5.xx; Database: My SQL 5.xx; Framework: Zend Framework 2.

SMS Gateway: ClickSend (http://clicksend.us/) (or, as an alternative, Plivo); 60 free SMS for test; Tested in Vietnam. HTTP GET: https://api.clicksend.com/http/v2/send.php?method=http&username=[user_name] &key=[key]&to=[to]&message=[message] EX: https://api.clicksend.com/http/v2/
send.php?method=http&username=tuanluong&key=
0214EB26-F0BC-F0B4-D23F-
8E1DD7D163AD&to=841656032615&message=Test+
message.

Client (e.g., iOS): Language: Swift; Supported iOS version: 7 and later.

Push server: Apple Push Notification service

Figure 8A:
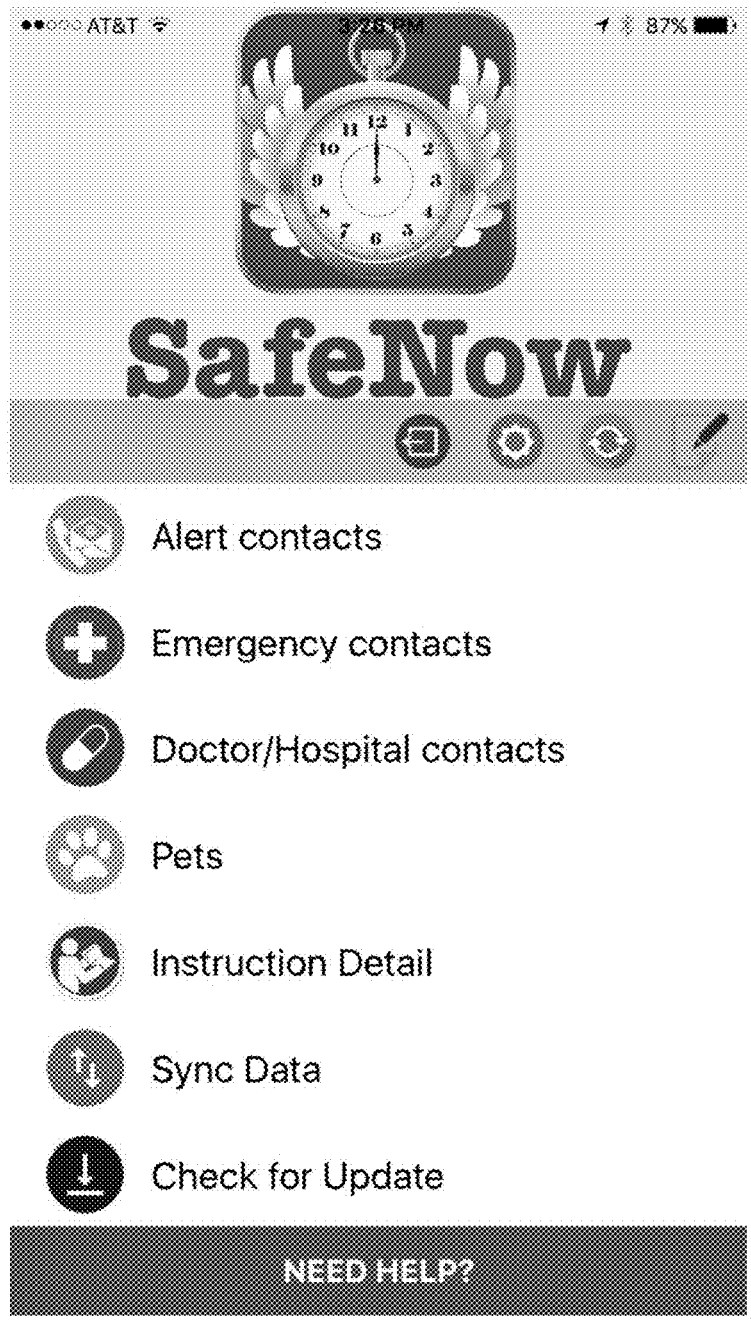
FIGS. 8A-8P show example screenshots of the example application running on an example user device.
Figure 8B:
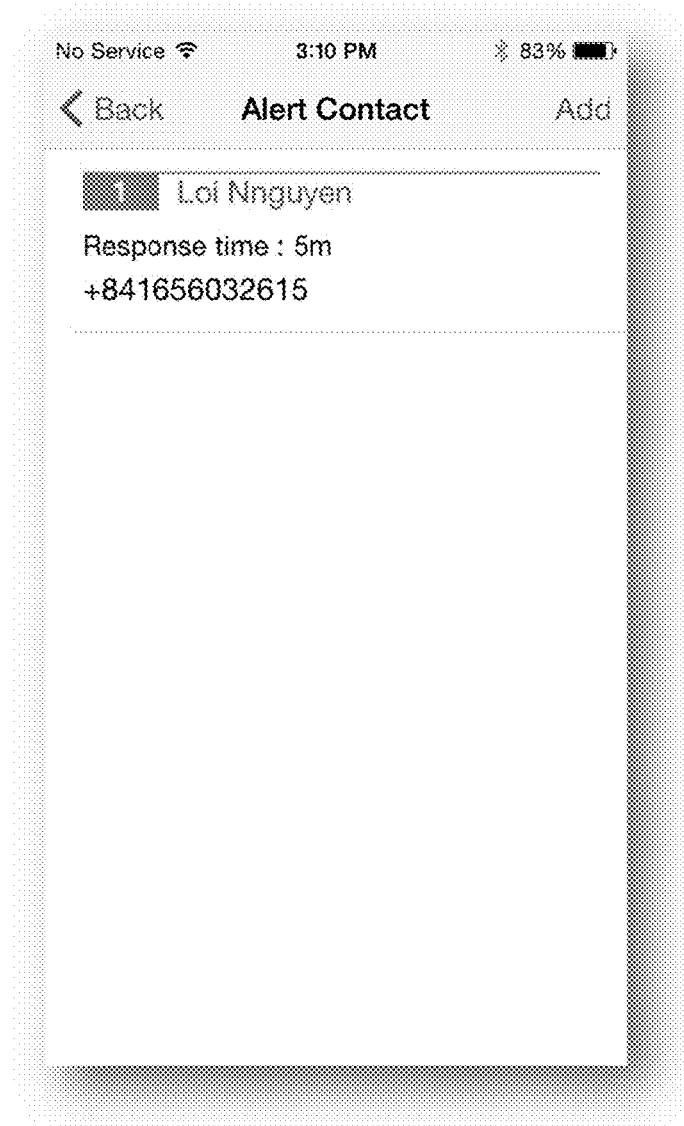
Figure 8C:
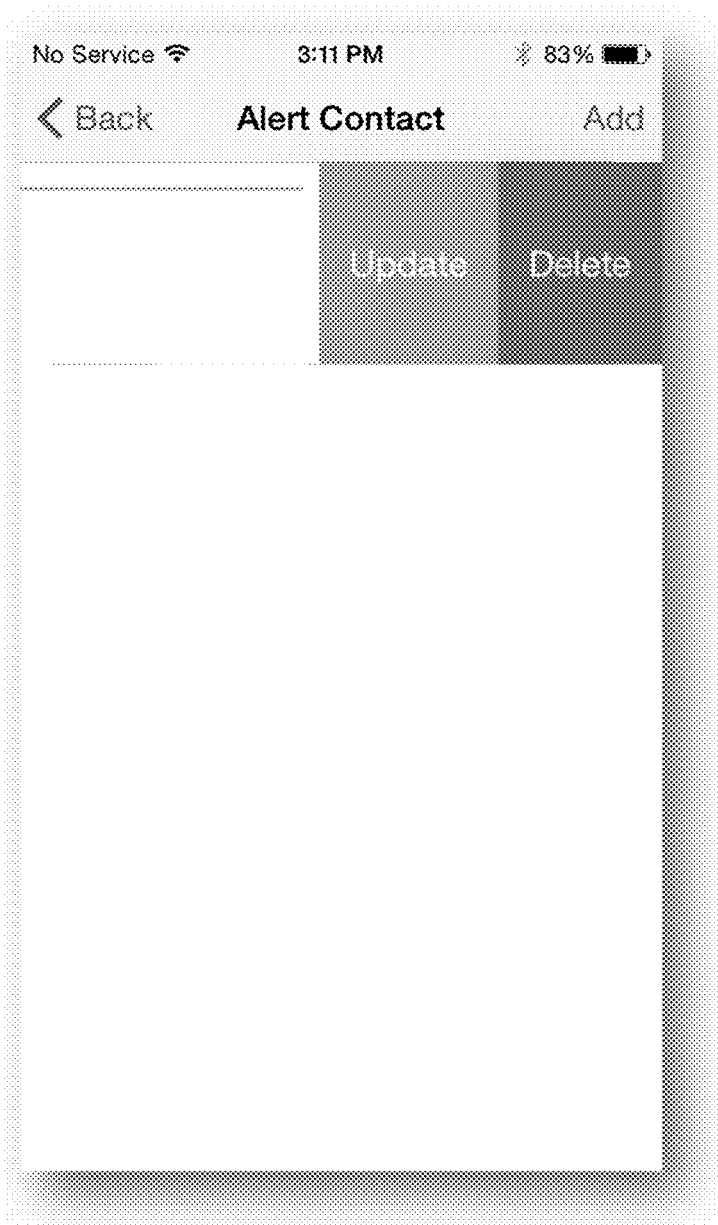
Figure 8D:
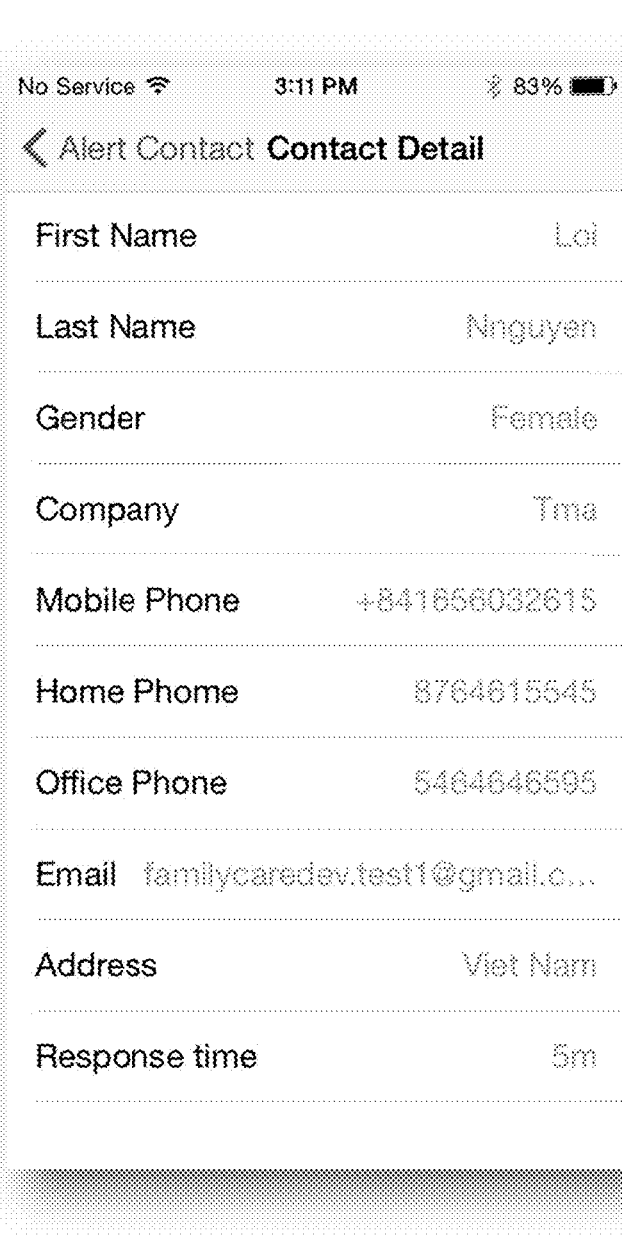
Figure 8E:
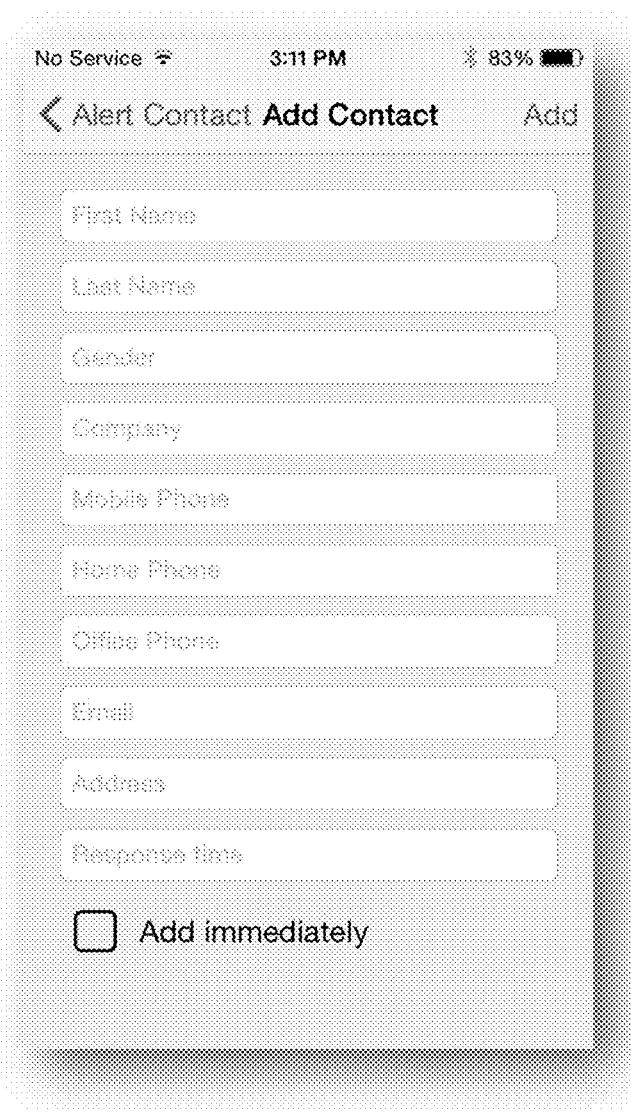
Figure 8F:
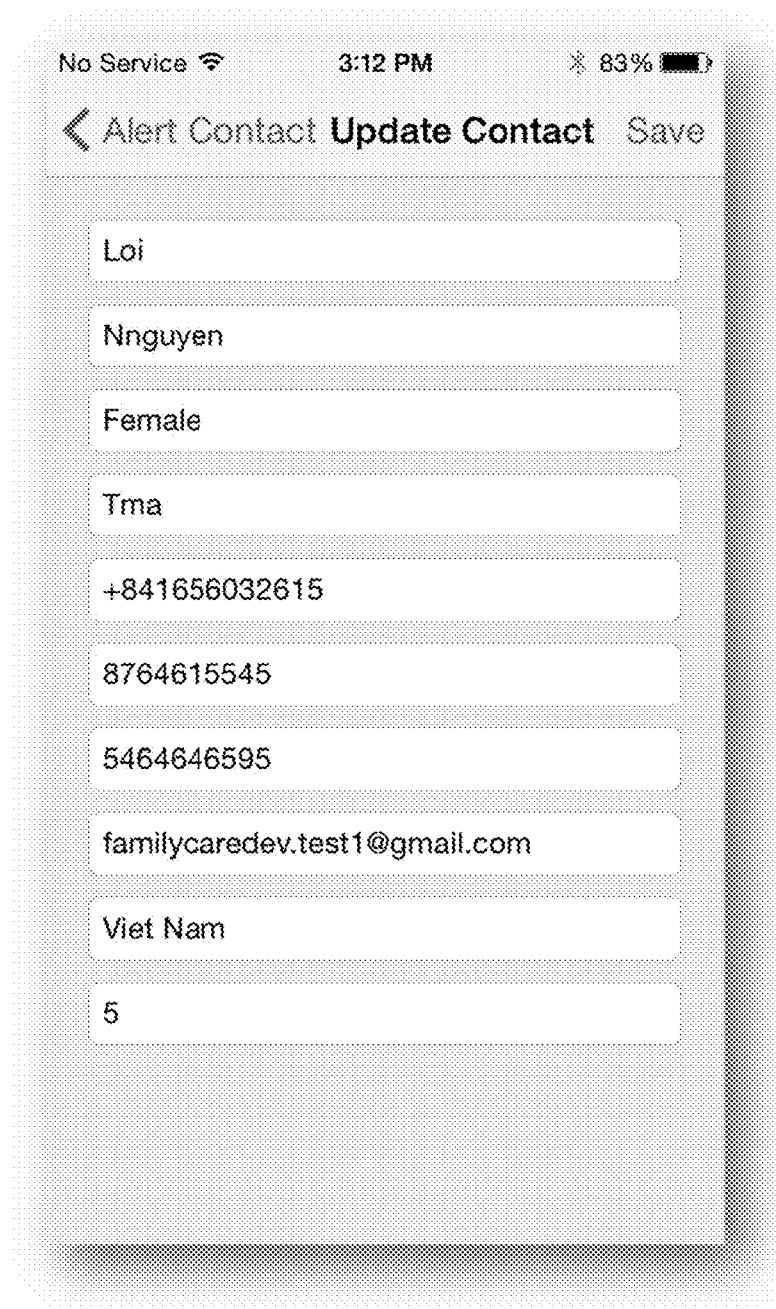
Figure 8G:
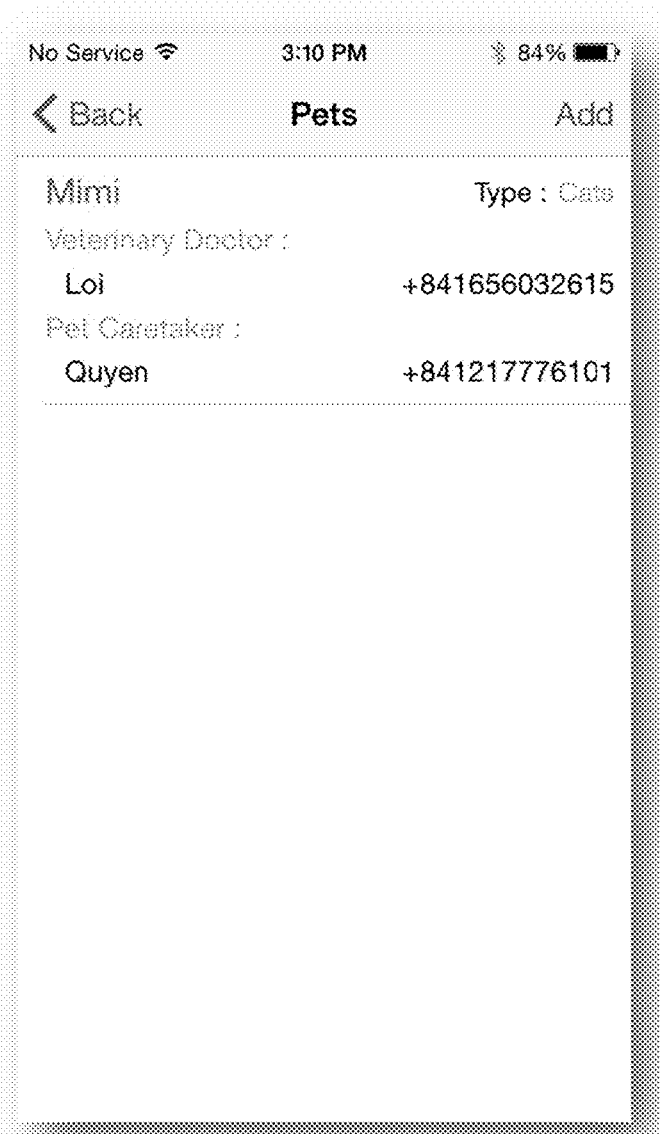
Figure 8H:
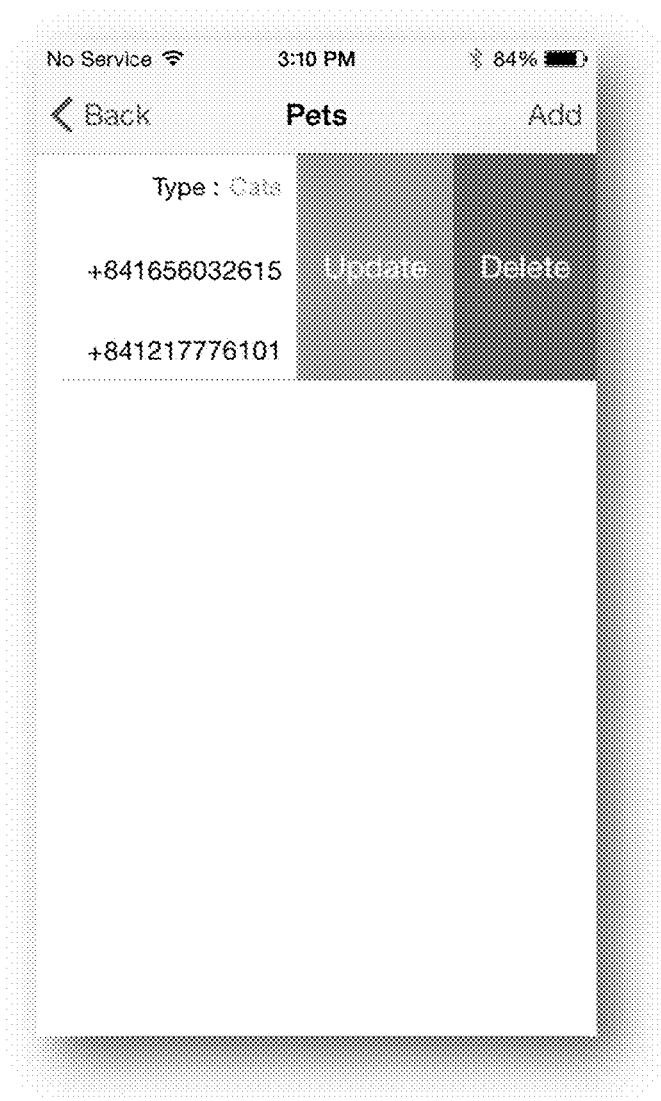
Figure 8I:
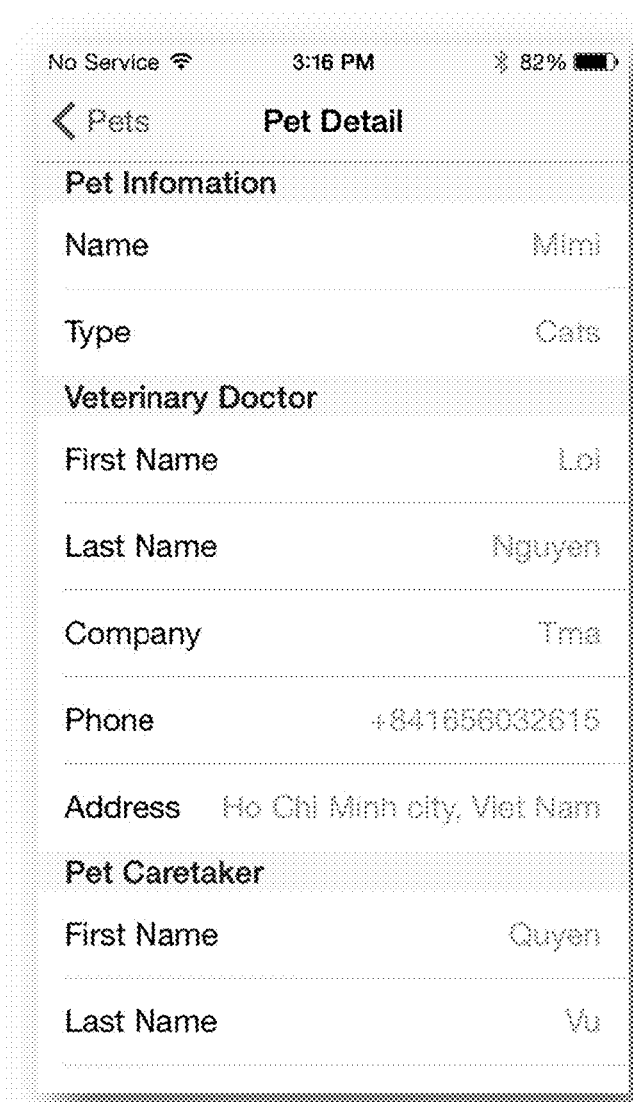
Figure 8J:
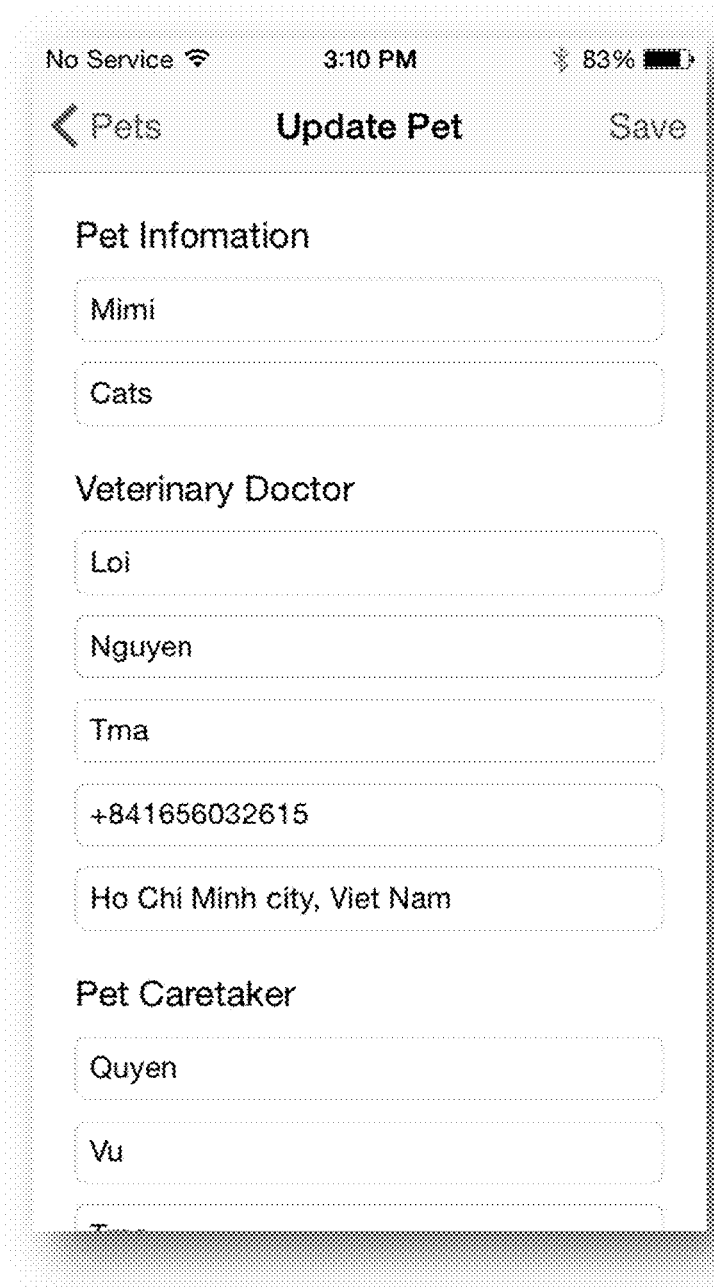
Figure 8K:
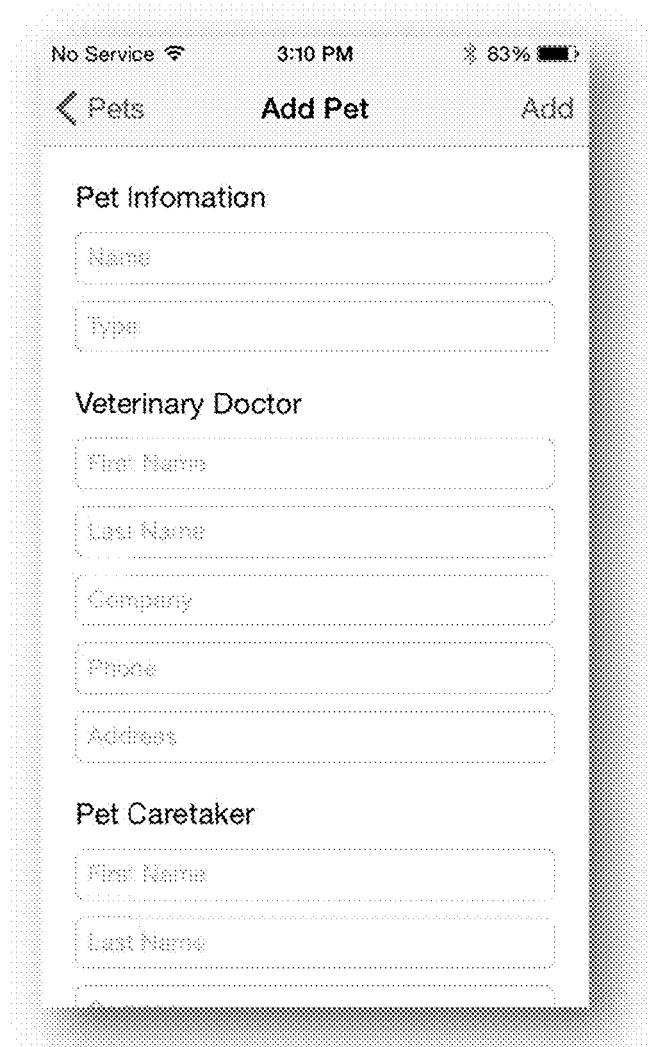
Figure 8L:
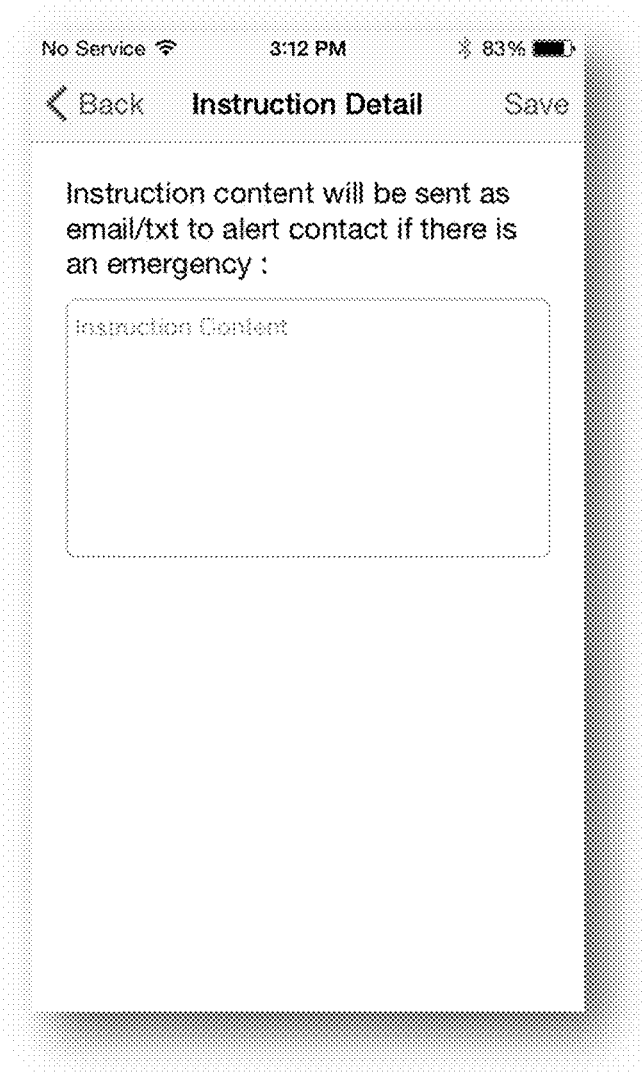
Figure 8M:
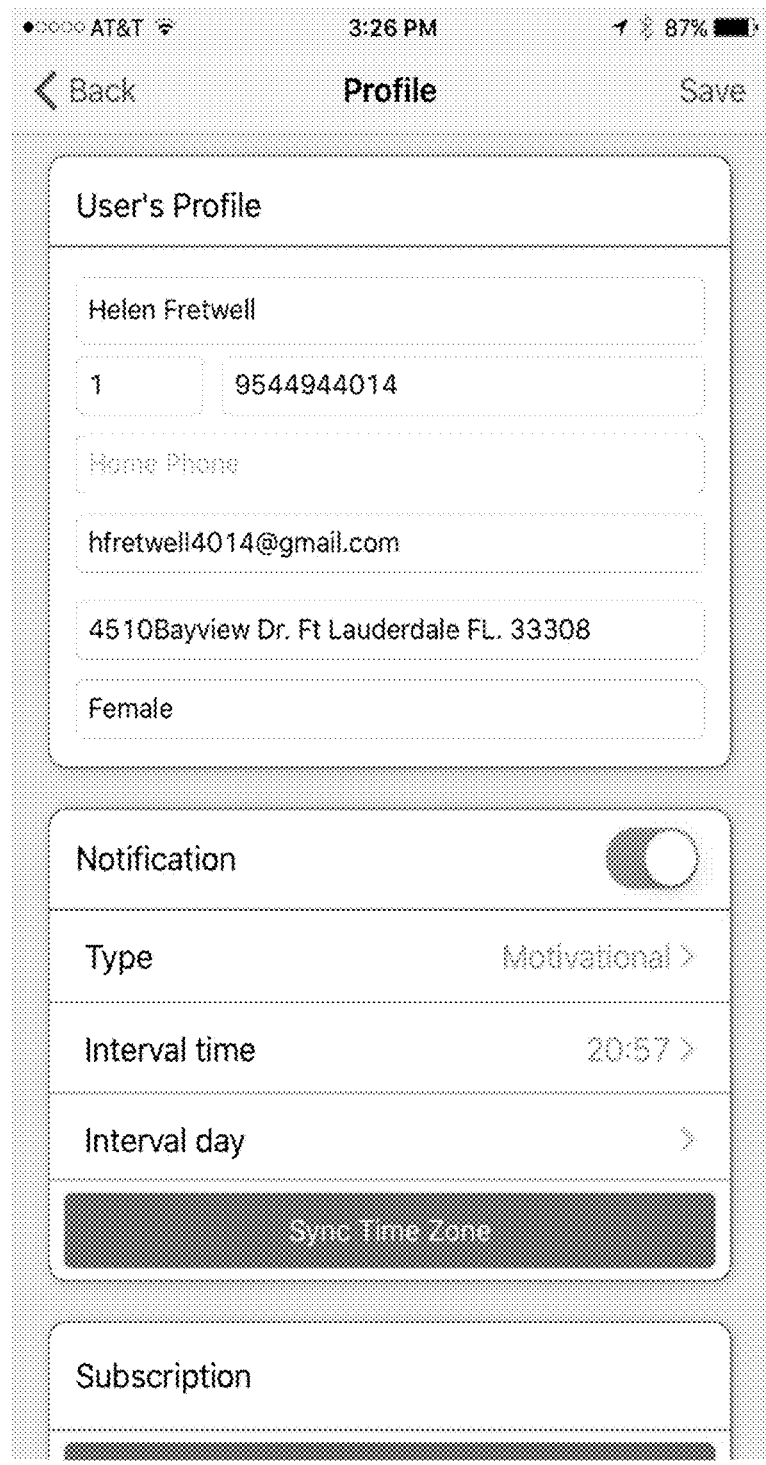
Figure 8N:
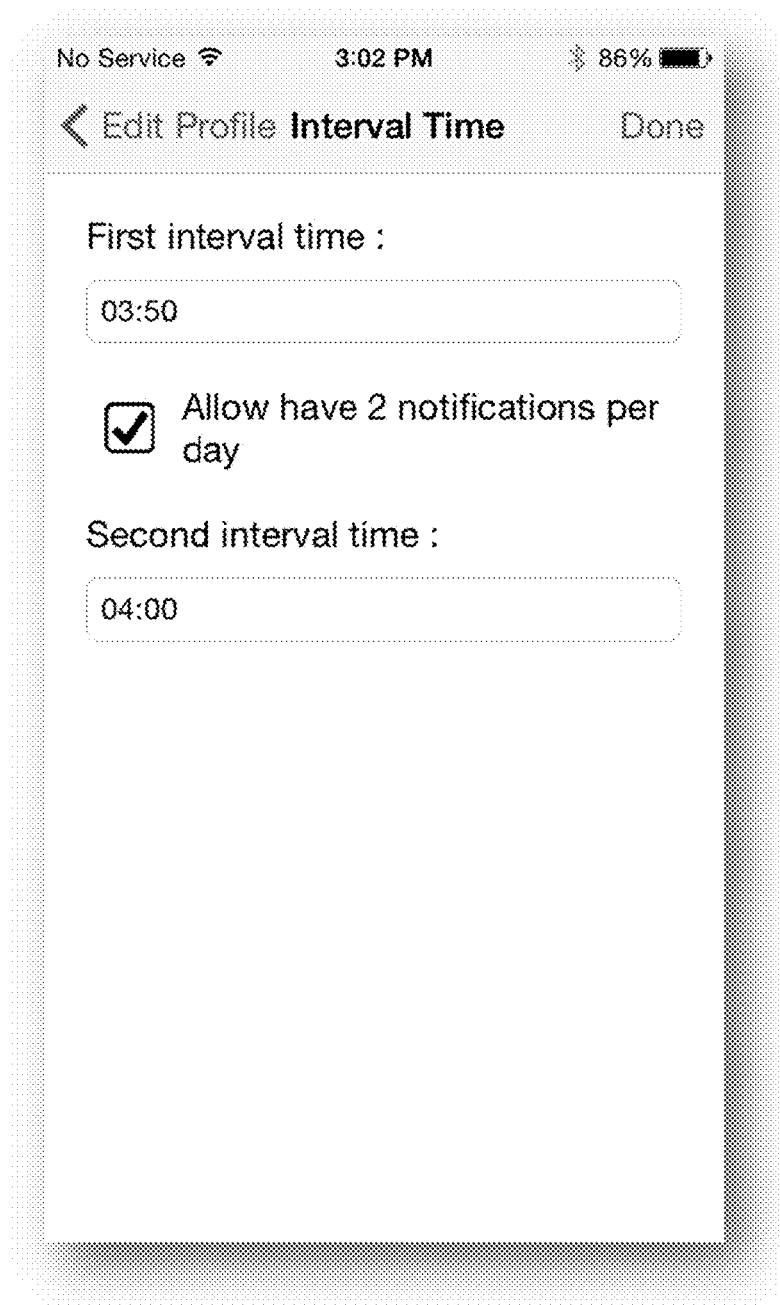
Figure 8O:
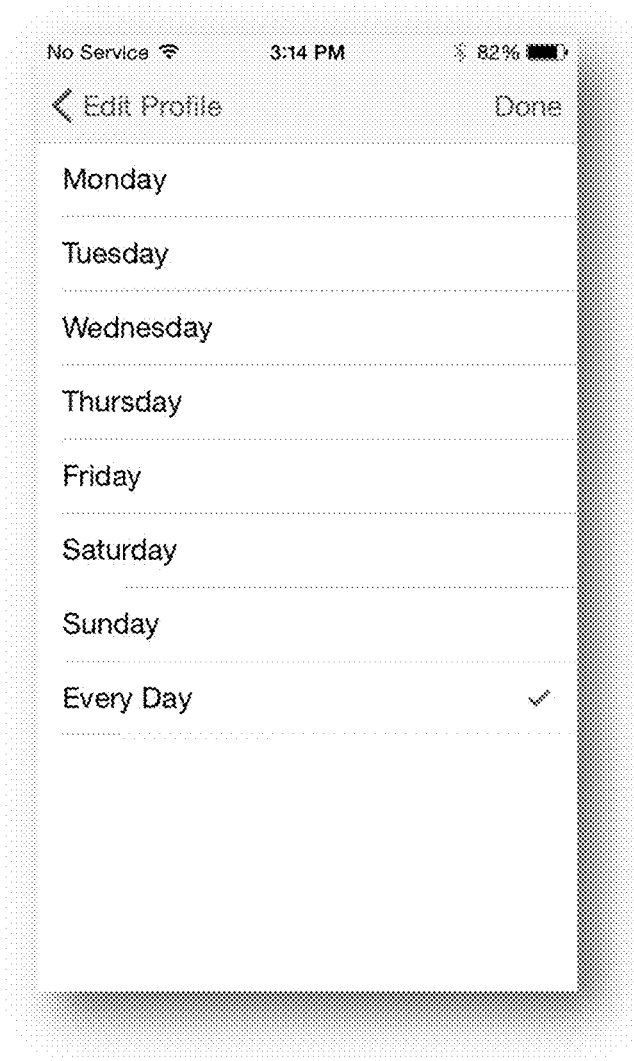
Figure 8P:
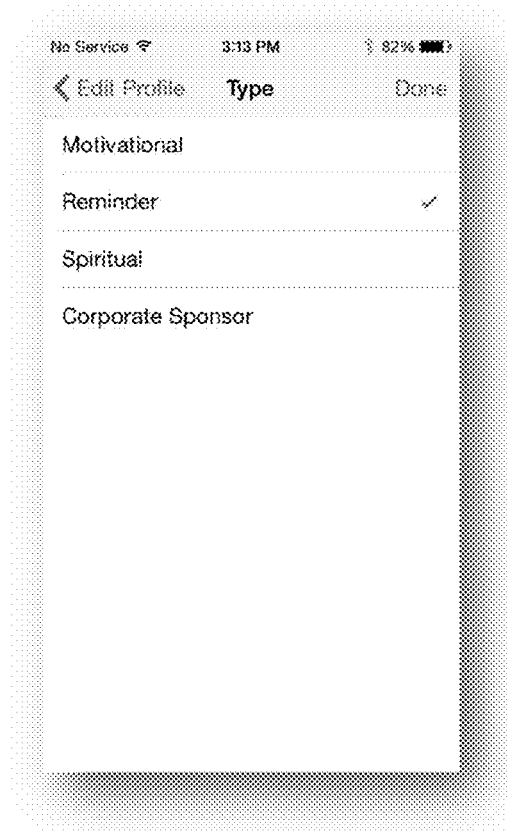

An example User interface is shown in FIGS. 8A-8P. FIG. 8A shows an example home screen. Note that FIG. 8A provides a red NEED HELP? Icon at the bottom of the screen. This can be used as an emergency call button sending a message to Alert Contacts, avoiding having to use the timer when using this button. Hence, it provides an emergency alert function that the user can trigger during emergencies.

FIGS. 8B-8F show screens for updating information about the alert contact individuals.

FIGS. 8G to 8K are screens related to pet information for monitoring pets.

FIG. 8L is a screen showing the instruction detail for the alert contacts in case of emergency.

FIGS. 8M-8P are screens for updating profile information about the user.

As will be appreciated by one of skill in the art, the example embodiments (as shown, for example, in FIGS. 1A, 1B) may be actualized as, or may generally utilize, a method, system, computer program product, or a combination of the foregoing. Accordingly, any of the embodiments may take the form of an entirely hardware embodiment, an entirely software embodiment (including firmware, resident software, microcode, etc.) for execution on hardware, or an embodiment combining software and hardware aspects that may generally be referred to herein as a "system." Furthermore, any of the embodiments may take the form of a computer program product on a computer-usable storage medium having computer-usable program code embodied in the medium.

In particular, the central server can be implemented by using any acceptable programmable computer system comprising one or more computers and one or more databases executing software for performing the functions discussed herein, whereas the mobile devices can utilized any of a number of mobile computer devices such as smart phones, tablets, phablets, laptops, etc. executing software that is obtained, for example, by download from an app store and that is properly installed on the mobile device for executing the functions described herein.

Any suitable computer usable (computer readable) medium may be utilized for storing the software. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CDROM), or other tangible optical or magnetic storage device; or transmission media such as those supporting the Internet or an intranet. Note that the computer usable or computer readable medium could even include another medium from which the program can be electronically captured, via, for instance, optical or magnetic scanning for example, then compiled, interpreted, or otherwise processed in a suitable manner, if necessary, and then stored in a computer memory of any acceptable type.

In the context of this document, a computer usable or computer readable medium may be any medium that can contain, store, communicate, propagate, or transport the program for use by, or in connection with, the instruction execution system, platform, apparatus, or device, which can include any suitable computer (or computer system) including one or more programmable or dedicated processor/controller(s). The computer usable medium may include a propagated data signal with the computer-usable program code embodied therewith, either in baseband or as part of a carrier wave. The computer usable program code may be transmitted using any appropriate medium, including but not limited to, the Internet, wireline, optical fiber cable, radio frequency (RF) or other means.

Computer program code for carrying out operations of the example embodiments for the server, the mobile device(s), or both, may be written by conventional means using any computer language, including but not limited to, an interpreted or event driven language such as BASIC, Lisp, VBA, or VBScript, or a GUI embodiment such as visual basic, a compiled programming language such as FORTRAN, COBOL, or Pascal, an object oriented, scripted or unscripted programming language such as Java, JavaScript, Perl, Smalltalk, C++, Object Pascal, or the like, artificial intelligence languages such as Prolog, a real-time embedded language such as Ada, or even more direct or simplified programming using ladder logic, an Assembler language, or directly programming using an appropriate machine language.

Examples of various embodiments may be described with reference to flowchart illustrations and/or block diagrams of methods, apparatus (systems) and computer program products according to the various embodiments. The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It will be understood that each block of the flowchart illustrations and/or block diagrams, and combinations of blocks in the flowchart illustrations and/or block diagrams, can be implemented by computer program instructions. These computer program instructions may be provided to a computing device including one or more processors of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions. The organization of such charts is for descriptive purposes for ease of communication, whereas the actual organization of the software code for some embodiments may utilize any of many different organizational structures that may differ substantially from the examples.

The computer program instructions may be stored or otherwise loaded in a computer-readable memory that can direct a computing device or system, or other programmable data processing apparatus, to function in a particular manner, such that the instructions stored in the computer readable memory produce an article of manufacture including instruction means which implement the function/act specified in the flowchart and/or block diagram block or blocks.

The software for executing on the server and/or the mobile device(s) comprises computer program instructions that are executed by being provided to an executing device or component, which can include a processor of a general purpose computer, a special purpose computer or controller, or other programmable data processing apparatus or component, such that the instructions of the computer program, when executed, create means for implementing the functions/acts specified in the flowchart and/or block diagram block or blocks. Hence, the computer program instructions are used to cause a series of operations to be performed on the executing device or component, or other programmable apparatus to produce a computer implemented process such that the instructions which execute on the computer or other programmable apparatus the steps for implementing the functions/acts specified in this disclosure. These steps or acts may be combined with operator or human implemented steps or acts and steps or acts provided by other components or apparatuses in order to carry out any number of example embodiments of the invention Although specific example embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method for remotely monitoring the health, safety, and/or welfare status of a user, said method comprising the steps of:

providing a computer system including a server and database;

providing user software for a user mobile device for installation and use by a user for supporting the method;

the computer system providing an input interface on the user mobile device using said user software, said input interface configured for accepting information from the user including information about a plurality of contact information about each one of a plurality of contact persons approved by the user, the contact information being stored in the database;

the computer system sending periodic ping messages to said user mobile device over a communication network;

in response to the user device receiving the ping messages, the user device providing a response interface on the user device configured to accept an input from the user acknowledging receipt of the ping messages;

in response to the user device accepting the input from the user acknowledging receipt of the ping messages, the user device sending an acknowledgement message to the computer system over the communication interface for acknowledging the ping messages;

the computer system monitoring receipt of the acknowledgement messages from the user device for detecting when no acknowledgement message is received from the user device in response to a ping message within a predetermined time period;

in response to the computer system detecting that no acknowledgement message was received from the user device in response to a ping message within the predetermined time period, the computer system selecting a first one of the contact persons from the contact information stored in the database;

the computer system contacting the first contact person by sending a help request message to a contact device of the first contact person over a communication network requesting approval or non-approval for checking the status of the user;

if the computer system receives a non-approval message from the contact device of the first contact person, the computer system selecting a second one of the contact persons from the contact information stored in the database; and the computer system contacting the second contact person by sending a help request message to a contact device of the second contact person over a communication network requesting approval or non-approval for checking the status of the user.

2. The method of claim 1, wherein, if the computer system does not receive an approval message from a device of any of contact persons contacted by the computer system, the computer system resets a timer and continues the method.

3. A method for remotely monitoring the health, safety, and/or welfare status of a user, said method comprising the steps of:

providing a computer system including a server and database;

providing user software installed on a user mobile device for use by a user for supporting the method;

the computer system storing information about each one of a plurality of contact persons, the contact information being stored in the database;

the computer system sending periodic ping messages to said user mobile device over a communication network;

in response to the user device receiving the ping messages, the user device providing a response interface on the user device configured to accept an input from the user acknowledging receipt of the ping messages;

in response to the user device accepting the input from the user acknowledging receipt of the ping messages, the user device sending an acknowledgement message to the computer system over the communication interface for acknowledging the ping messages;

the computer system monitoring receipt of the acknowledgement messages from the user device for detecting when no acknowledgement message is received from the user device in response to one of the ping messages within a predetermined time period;

in response to the computer system detecting that no acknowledgement message was received from the user device in response to the one of the ping messages within the predetermined time period, the computer system selecting a first one of the contact persons from the contact information stored in the database;

the computer system contacting the first one of the contact persons by sending a help request message to a contact device of the first one of the contact persons over a communication network requesting approval or non-approval for checking the status of the user;

if the computer system receives a non-approval message or no message from the contact device of the first one of the contact persons, the computer system selecting a second one of the contact persons from the contact information stored in the database; and the computer system contacting the second one of the contact persons by sending a help request message to a contact device of the second one of the contact persons over a communication network requesting approval or non-approval for checking the status of the user.

4. The method of claim 3, wherein, if the computer system does not receive an approval message from a device of any of contact persons contacted by the computer system, the computer system resets a timer and continues the method.

5. A method for remotely monitoring the health, safety, and/or welfare status of a user, said method comprising the steps of:

providing a computer system including a server and database;

providing user software installed on a user mobile device for use by a user for supporting the method;

the computer system storing information about each one of a plurality of contact persons, the contact information being stored in the database;

the computer system sending periodic ping messages to said user mobile device over a communication network;

in response to the user device receiving the ping messages, the user device providing a response interface on the user device configured to accept an input from the user acknowledging receipt of the ping messages;

in response to the user device accepting the input from the user acknowledging receipt of the ping messages, the user device sending an acknowledgement message to the computer system over the communication interface for acknowledging the ping messages;

the computer system monitoring receipt of the acknowledgement messages from the user device for detecting when no acknowledgement message is received from the user device in response to one of the ping messages within a predetermined time period;

in response to the computer system detecting that no acknowledgement message was received from the user device in response to the one of the ping messages within the predetermined time period, the computer system selecting a first one of the contact persons from the contact information stored in the database;

the computer system contacting the first one of the contact persons by sending a help request message to a contact device of the first one of the contact persons over a communication network requesting approval or non-approval for checking the status of the user;

if the computer system receives a non-approval message or no message from the contact device of the first one of the contact persons, the computer system selecting a second one of the contact persons from the contact information stored in the database; and the computer system contacting the second one of the contact persons by sending a help request message to a contact device of the second one of the contact persons over a communication network requesting approval or non-approval for checking the status of the user, wherein if the computer system does not receive an approval message from a device of any of contact persons contacted by the computer system, the computer system resets a timer and continues the method.

* * * * *